United States Patent [19]

Schlunt

[11] Patent Number: 5,032,865
[45] Date of Patent: Jul. 16, 1991

[54] CALCULATING THE DOT PRODUCT OF LARGE DIMENSIONAL VECTORS IN TWO'S COMPLEMENT REPRESENTATION

[75] Inventor: Richard S. Schlunt, Loma Linda, Calif.

[73] Assignee: General Dynamics Corporation Air Defense Systems Div., Pomona, Calif.

[21] Appl. No.: 440,019

[22] Filed: Nov. 21, 1989

Related U.S. Application Data

[63] Continuation-in-part of Ser. No. 133,096, Dec. 14, 1987, Pat. No. 4,884,232.

[51] Int. Cl.$^5$ .................... G06F 7/00; G06F 15/00
[52] U.S. Cl. .................................................. 364/750.5
[58] Field of Search ............. 364/750.5, 754, 757-760

[56] References Cited

U.S. PATENT DOCUMENTS

| | | | |
|---|---|---|---|
| 3,163,749 | 12/1964 | Roth et al. | 364/758 |
| 3,372,269 | 3/1968 | MacSorley et al. | 364/760 |
| 3,670,956 | 6/1972 | Calhoun | 364/758 |
| 3,691,359 | 9/1972 | Dell et al. | 364/758 |
| 3,752,971 | 8/1973 | Calhoun et al. | 364/758 |
| 4,130,878 | 12/1978 | Balph et al. | 364/758 |
| 4,153,938 | 5/1979 | Ghest et al. | 364/758 |
| 4,369,500 | 1/1983 | Fette et al. | 364/758 |
| 4,454,590 | 6/1984 | Belt et al. | 364/750.5 |
| 4,490,805 | 12/1984 | Tamura | 364/750.5 |

OTHER PUBLICATIONS

Waser, "High-Speed Monolithic Multipliers for Real--Time Digital Signal Processing" IEEE *Computer* pp. 19-29, Oct. 1978.

Oberman, *Digital Circuits for Binary Arithmetic*, pp. 124-127, John Willey & Sons New York, 1979.

Takagi et al, "High-Speed VLSI Multiplication Algorithm with a Redundant Binary Addition Tree", *IEEE Trans on Computers*, vol. C-34, #9, pp. 789-796, 9/85.

Nakomura, "Algorithms for Iterative Array Multiplication", *IEEE Trans. on Computers*, vol. C-35, #8, Aug. 1986, pp. 713-719.

*Primary Examiner*—Dale M. Shaw
*Attorney, Agent, or Firm*—Michael H. Jester; Leo R. Carroll

[57] ABSTRACT

A system for calculating the dot product of the vectors A(k) and B(k) of dimension Q written in two's complement representation. A bus has a width sufficient for communicating signals representing a plurality of bit planes $A(j,Q)$ and $B(n,Q)$ corresponding to the two's complement representations of A(k) and B(k), respectively. Circuitry connected to the bus calculates $C(j,n) = A(j,Q).B(n,Q)$ for each of said bit planes. An adder sequentially determines $R(n) = C(0,n)2^0 + C(1,n)2^1 + \ldots C(N-1,n)2^{(N-1)} - C(N,n)2^N$ for $n = 0, 1, 2 \ldots N$. An accumulator connected to the adder shifts and accumulates the R(n)'s to thereby determine the dot product according to:

$$\sum_{K=1}^{Q} A(k)B(k) = R(0)2^0 + R(1)2^1 + \ldots + R(N-1)2^{N-1} - R(N)2^N.$$

1 Claim, 4 Drawing Sheets

TWO'S COMPLEMENT REPRESENTATION OF A(k)

$2^{\wedge\wedge}j = 2^j$

FIG. 3a $2(-1) + 3(2) + -2(-3) + 4(-1) = -2 + 6 + 6 - 4 = 6$

```
       MSB                                   MSB
A(1) = 00000010             B(1) = 11111111
A(2) = 00000011             B(2) = 00000010
A(3) = 11111110             B(3) = 11111101
A(4) = 00000100             B(3) = 11111111
       LSB                                   LSB
```

8-bit 2's Complement Representation $$R(0) = [0100] \cdot [1011] 2^{\wedge}0 + [0100] \cdot [1101] 2^{\wedge}1 + [0100] \cdot [1011] 2^{\wedge}2 + [0100] \cdot [1011] 2^{\wedge}3$$
$$+ [0100] \cdot [1011] 2^{\wedge}4 + [0100] \cdot [1011] 2^{\wedge}5 + [0100] \cdot [1011] 2^{\wedge}6 - [0100] \cdot [1011] 2^{\wedge}7$$
$$= (0) 2^{\wedge}0 + (1) 2^{\wedge}1 + (0) 2^{\wedge}2 + (0) 2^{\wedge}3 + (0) 2^{\wedge}4 + (0) 2^{\wedge}5 + (0) 2^{\wedge}6 - (0) 2^{\wedge}7$$
$$= 2$$

$$R(1) = [1110] \cdot [1011] 2^{\wedge}0 + [1110] \cdot [1101] 2^{\wedge}1 + [1110] \cdot [1011] 2^{\wedge}2 + [1110] \cdot [1011] 2^{\wedge}3$$
$$+ [1110] \cdot [1011] 2^{\wedge}4 + [1110] \cdot [1011] 2^{\wedge}5 + [1110] \cdot [1011] 2^{\wedge}6 - [1110] \cdot [1011] 2^{\wedge}7$$
$$= (2) 2^{\wedge}0 + (2) 2^{\wedge}1 + (2) 2^{\wedge}2 + (2) 2^{\wedge}3 + (2) 2^{\wedge}4 + (2) 2^{\wedge}5 + (2) 2^{\wedge}6 - (2) 2^{\wedge}7$$
$$= -2$$

$$R(2) = [0011] \cdot [1011] 2^{\wedge}0 + [0011] \cdot [1101] 2^{\wedge}1 + [0011] \cdot [1011] 2^{\wedge}2 + [0011] \cdot [1011] 2^{\wedge}3$$
$$+ [0011] \cdot [1011] 2^{\wedge}4 + [0011] \cdot [1011] 2^{\wedge}5 - [0011] \cdot [1011] 2^{\wedge}6 - [0011] \cdot [1011] 2^{\wedge}7$$
$$= (2) 2^{\wedge}0 + (1) 2^{\wedge}1 + (2) 2^{\wedge}2 + (2) 2^{\wedge}3 + (2) 2^{\wedge}4 + (2) 2^{\wedge}5 - (2) 2^{\wedge}6 - (2) 2^{\wedge}7$$
$$= -4$$

$$R(3) = [0010] \cdot [1011] 2^{\wedge}0 + [0010] \cdot [1101] 2^{\wedge}1 + [0010] \cdot [1011] 2^{\wedge}2 + [0010] \cdot [1011] 2^{\wedge}3$$
$$+ [0010] \cdot [1011] 2^{\wedge}4 + [0010] \cdot [1011] 2^{\wedge}5 - [0010] \cdot [1011] 2^{\wedge}6 - [0010] \cdot [1011] 2^{\wedge}7$$
$$= (2) 2^{\wedge}0 + (1) 2^{\wedge}1 + (2) 2^{\wedge}2 + (2) 2^{\wedge}3 + (2) 2^{\wedge}4 + (2) 2^{\wedge}5 - (2) 2^{\wedge}6 - (2) 2^{\wedge}7$$
$$= -3$$

FIG. 3b $R(4) = [0010] \cdot [1011]2^{\wedge}0 + [0010] \cdot [1011]2^{\wedge}1 + [0010] \cdot [1101]2^{\wedge}2 + [0010] \cdot [1011]2^{\wedge}3$
$\phantom{R(4)} + [0010] \cdot [1011]2^{\wedge}4 + [0010] \cdot [1011]2^{\wedge}5 + [0010] \cdot [1011]2^{\wedge}6 + [0010] \cdot [1011]2^{\wedge}7$
$\phantom{R(4)} = (2)2^{\wedge}0 + (1)2^{\wedge}1 + (2)2^{\wedge}2 + (2)2^{\wedge}3 + (2)2^{\wedge}4 + (2)2^{\wedge}5 + (2)2^{\wedge}6 - (2)2^{\wedge}7$
$\phantom{R(4)} = -3$ $R(5) = [0010] \cdot [1011]2^{\wedge}0 + [0010] \cdot [1011]2^{\wedge}1 + [0010] \cdot [1101]2^{\wedge}2 + [0010] \cdot [1011]2^{\wedge}3$
$\phantom{R(5)} + [0010] \cdot [1011]2^{\wedge}4 + [0010] \cdot [1011]2^{\wedge}5 + [0010] \cdot [1011]2^{\wedge}6 - [0010] \cdot [1011]2^{\wedge}7$
$\phantom{R(5)} = (2)2^{\wedge}0 + (1)2^{\wedge}1 + (2)2^{\wedge}2 + (2)2^{\wedge}3 + (2)2^{\wedge}4 + (2)2^{\wedge}5 + (2)2^{\wedge}6 - (2)2^{\wedge}7$
$\phantom{R(5)} = -3$ $R(6) = [0010] \cdot [1011]2^{\wedge}0 + [0010] \cdot [1011]2^{\wedge}1 + [0010] \cdot [1101]2^{\wedge}2 + [0010] \cdot [1011]2^{\wedge}3$
$\phantom{R(6)} + [0010] \cdot [1011]2^{\wedge}4 + [0010] \cdot [1011]2^{\wedge}5 + [0010] \cdot [1011]2^{\wedge}6 - [0010] \cdot [1011]2^{\wedge}7$
$\phantom{R(6)} = (2)2^{\wedge}0 + (1)2^{\wedge}1 + (2)2^{\wedge}2 + (2)2^{\wedge}3 + (2)2^{\wedge}4 + (2)2^{\wedge}5 + (2)2^{\wedge}6 - (2)2^{\wedge}7$
$\phantom{R(6)} = -3$ $R(7) = [0010] \cdot [1011]2^{\wedge}0 + [0010] \cdot [1011]2^{\wedge}1 + [0010] \cdot [1101]2^{\wedge}2 + [0010] \cdot [1011]2^{\wedge}3$
$\phantom{R(7)} + [0010] \cdot [1011]2^{\wedge}4 + [0010] \cdot [1011]2^{\wedge}5 + [0010] \cdot [1011]2^{\wedge}6 - [0010] \cdot [1011]2^{\wedge}7$
$\phantom{R(7)} = (2)2^{\wedge}0 + (1)2^{\wedge}1 + (2)2^{\wedge}2 + (2)2^{\wedge}3 + (2)2^{\wedge}4 + (2)2^{\wedge}5 + (2)2^{\wedge}6 - (2)2^{\wedge}7$
$\phantom{R(7)} = -3$ $\sum_{0}^{6} R(n)2^{n} \cdot R(7)2^{7} = 2 \cdot 4 \cdot 16 \cdot 24 \cdot 48 \cdot 96 \cdot 192 + 384 = 6$

FIG. 3c

CALCULATING THE DOT PRODUCT OF LARGE DIMENSIONAL VECTORS IN TWO'S COMPLEMENT REPRESENTATION

CROSS-REFERENCE TO RELATED APPLICATION

This application is a continuation-in-part of my pending U.S. patent application Ser. No. 07/133,096 filed Dec. 14, 1987 entitled "Parallel Processing Circuits For High Speed Calculation of the Dot Product of Large Dimensional Vectors". Said application issued as U.S. Pat. No. 4,884,232 on Nov. 28, 1989.

BACKGROUND OF THE INVENTION

The present invention relates to digital signal processing, and more particularly, to high speed multiplying and adding circuits particularly suited for calculating the dot product of large dimensional vectors.

Almost all digital signal processing algorithms involve the calculation of the dot product of vectors having a length greater than sixty-four bits. For example, such calculations are required in performing convolutions, discrete Fourier transforms, correlations and linear transforms.

Conventionally, the dot product of vectors A and B is computed by sequentially multiplying the components of A and B together and adding the same. On a general purpose digital computer this involves programming a loop. The time required to compute the dot products of vector A and B is a linear function of the size N of each vector. Substantial computational delays can result if N is large. If the vector B is held fixed, the computational delay becomes even more pronounced.

Heretofore digital systems have been provided for multiplying and adding at high speeds. See for example U.S. Pat. Nos. 4,369,500; 4,153,938; 4,142,242; 4,135,249; 4,031,377; 3,752,971; 3,691,359; 3,670,956; 3,372,269 and 3,163,749. However, all of these patents describe circuits which perform multiple multiplications serially, thereby inherently limiting the speed at which the dot product of large dimensional vectors can be calculated. See also A. Weinberger, "Multiplier Decoding with Look-Ahead", IBM Technical Disclosure Bulletin, Vol. 20, No. 9, February, 1978, pp. 3591-3593 and T. Jayashree and D. Basu, "On Binary Multiplication Using Quarter Square Algorithm", IEEE Transactions on Computers, September, 1976, pp. 957-960. See also U. S. Pat. No. 3,732,409 of Fletcher et al. and "Digital Logic Fundamentals", pp. 388-392, by Thomas L. Floyd, 1977, Charles E. Merrill Publishing Company.

In my U.S. Pat. No. 4,884,232 granted November 28, 1989, I disclose a digital circuit for executing a parallel algorithm to compute the dot product of large dimensional vectors at very high speed. The circuit may be made of a plurality of cascaded 1-bit correlator chips and a plurality of arithmetic logic unit (ALU) chips that sum the outputs of the correlator chips. I also disclose in that patent a general purpose computer architecture for implementing the parallel algorithm.

Two's complement has become a standard today in the computer field for representing positive and negative values. Analog-to-digital (A/D) converters are available today with a two's complement output. It would therefore be desirable to provide an approach for high speed calculation of the dot product of large dimensional vectors in two's complement representation.

SUMMARY OF THE INVENTION

It is therefore the primary object of the present invention to provide an improved digital signal processing system for high speed multiplication and addition.

It is another object of the present invention to provide a high speed digital system for calculating the dot product of large dimensional vectors.

It is another object of the present invention to provide and improved digital processing system for high speed calculation of convolutions, discrete Fourier transforms, correlations and linear transforms as well as transversal filters and other algorithms involving sequences of numbers.

It is another object of the present invention to provide a digital system for calculating the dot product of large dimensional vectors in which the processing time is substantially reduced over prior systems which have performed multiplications in serial fashion.

It is another object of the present invention to provide a high speed sum-of-products processor that can be readily implemented with existing integrated circuits.

It is another object of the present invention to provide an improved digital signal processing system for high speed calculation of the dot product of two large dimensional vectors in two's complement representation.

The present invention provides a system for calculating the dot product of the vectors $A(k)$ and $B(k)$ of dimension Q written in two's complement representation. A bus has a width sufficient for communicating signals representing a plurality of bit planes $A(j,Q)$ and $B(n,Q)$ corresponding to the two's complement representations of $A(k)$ and $B(k)$, respectively. Circuitry connected to the bus calculates $C(j,n) = A(j,Q) \cdot B(n,Q)$ for each of said bit planes. An adder sequentially determines $R(n) = C(0,n)2^0 + C(1,n)2^1 + \ldots + C(N-1,n)2^{(N-1)} + C(N,n)2^N$ for $n = 0, 1, 2 \ldots N$. An accumulator connected to the adder shifts and accumulates the $R(n)$'s to thereby determine the dot product according to $$\sum_{K=1}^{Q} A(k)B(k) = R(0)2^0 + R(1)2^1 + \ldots + R(N-1)2^{N-1} - R(N)2^N$$

BRIEF DESCRIPTION OF THE DRAWINGS

FIG. 3 illustrates a specific example of the calculation of the dot product of two vectors in two's complement in accordance with my invention.

DESCRIPTION OF THE PREFERRED EMBODIMENTS

The entire disclosure of my U.S. Pat. No. 4,884,232 granted Nov. 28, 1989 and entitled "Parallel Processing Circuits for High Speed Calculation of the Dot Product of Large Dimensional Vectors" is specifically corporated herein by reference.

The dot product ".", of two vectors A and B is defined to be:

$$A \cdot B = \sum_{i=1}^{N} a(i)b(i)$$

where $a(i)$ and $b(i)$ are the ith component of A and B respectively and N is the number of components.

The following is a derivation of a parallel processing algorithm which may be implemented in integrated circuits. This algorithm allows the simultaneous multiplying and summing of arbitrary pairs of numbers regardless of polarity. The algorithm requires that the numbers use two's complement representation.

In two's complement representation, the sequence $$a(N)a(N-1) \ldots a(1)a(0),$$

where $a(i)$ is a zero or a one, represents the number $$-a(N)2^N + \sum_{i=0}^{N-1} a(i)2^i$$

$a(N)$ is referred to as the sign bit and is a one for a negative number and a zero for a positive number. The product of two vectors $A(k)$ and $B(k)$ where $$A(k) = -a(k,N)2^N + \sum_{j=0}^{N-1} a(k,j)2^j \text{ and } B(k) = -b(k,N)2^N +$$

$$\sum_{j=0}^{N-1} b(k,j)2^j \text{ is: } a(k,N)b(k,N)2^{2N} - \sum_{j=0}^{N-1} a(k,N)b(k,j)2^{j+N} -$$

$$\sum_{j=0}^{N-1} b(k,N)a(k,j)2^{j+N} + \sum_{n=0}^{N-1} \left[ \sum_{j=0}^{N-1} a(k,j)b(k,n)2^j \right] 2^n.$$

If one takes the sum of Q such products, then $$\sum_{k=1}^{Q} A(k)B(k) = \sum_{k=1}^{Q} a(k,N)b(k,N)2^{2N} -$$

$$\sum_{j=0}^{N-1} \sum_{k=1}^{Q} a(k,N)b(k,j)2^{j+N} - \sum_{j=0}^{N-1} \left[ \sum_{k=1}^{Q} b(k,N)a(k,j)2^{j+N} \right] +$$

$$\sum_{n=0}^{N-1} \left[ \sum_{j=0}^{N-1} \sum_{k=1}^{Q} a(k,j)b(k,n)2^j \right] 2^n.$$

Defining:
$A(i,Q) = (a(1,i), a(2,i) \ldots, a(Q,i))$
$B(i,Q) = (b(1,i), b(2,i) \ldots, b(Q,i))$
to be Q dimensional vectors for $i = 0, 1, 2, \ldots N$, then the above sum can be rewritten as:

$$2^{2N} A(N,Q) \cdot B(N,Q) - \sum_{j=0}^{N-1} A(N,Q) \cdot B(j,Q) 2^{N+j} -$$

$$\sum_{j=0}^{N-1} A(j,Q) \cdot B(N,Q) 2^{N+j} + \sum_{n=0}^{N-1} \left[ \sum_{j=0}^{N-1} A(j,Q) \cdot B(n,Q) 2^j \right] 2^n$$

which equals $$\sum_{n=0}^{N} \sum_{j=0}^{N} [SGN(j,n)C(j,n)2^j] 2^n$$

where $C(j,n) = A(j,Q) \cdot B(n,Q)$ and $SGN(j,n) = 1$ if $(j=N$ and $n=N)$ or $(j \neq N$ and $n \neq N)$ and $-1$ otherwise.

If one defines $$R(n) = C(0,n)2^0 + C(1,n)2^1 + \ldots$$
$$C(N-1,n)2^{(N-1)} - C(N,n)2^N$$

for $n = 0, 1, 2, \ldots N$, then $$\sum_{k=1}^{Q} A(k)B(k) = R(0)2^0 + R(1)2^1 + \ldots +$$

$$R(N-1)2^{N-1} - R(N)2^N$$

Since $a(k,j)$ and $b(k,n)$ are either a zero or a one, $C(j,n)$ represents the number of ones that the vectors $A(j,Q)$ and $B(n,Q)$ have in corresponding positions. This means that the dot product can be found by "ANDING" the vectors $A(j,Q)$ and $B(n,Q)$ and adding the ones that appear at the output of the AND gates.

Figure 1:
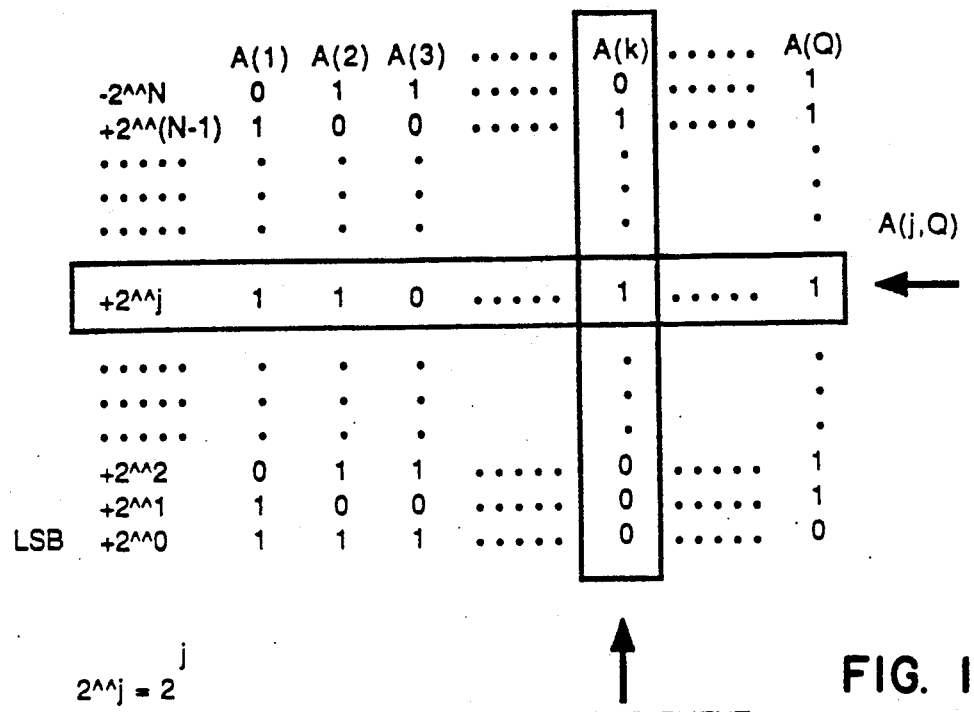
FIG. 1 is a bit plane representation illustrating the operation of the parallel processing algorithm executed by my improved digital signal processing system.

As indicated in FIG. 1, $A(j,Q)$ is the bit plane associated with the $2^j$ level. This means that $C(j,n)$ is the dot product of the $2^j$ bit plane of the $A(k)$'s with the $2^n$ bit plane of the $B(k)$'s and is the coefficient associated with $2^{(n+j)}$ in the final result. Hardware to implement this algorithm requires a buss wide enough to handle the bit planes. If the $R(n)$'s can be calculated sequentially, starting with $R(N)$ then $\Sigma A(k)B(k)$ can be found by shifting and accumulating the $R(n)$'s. This method for finding the sum of products has a number of advantages. The main one being that only $N+1$ cycles are needed to compute the sum of Q products where $N+1$ is the number of bits used to represent $A(k)$. In addition, all of the bits are saved in calculating the sum of products. In the illustrated embodiment, Q was chosen to be 64 and $N=7$. $N=7$ means that eight bit numbers are used.

Figure 2:
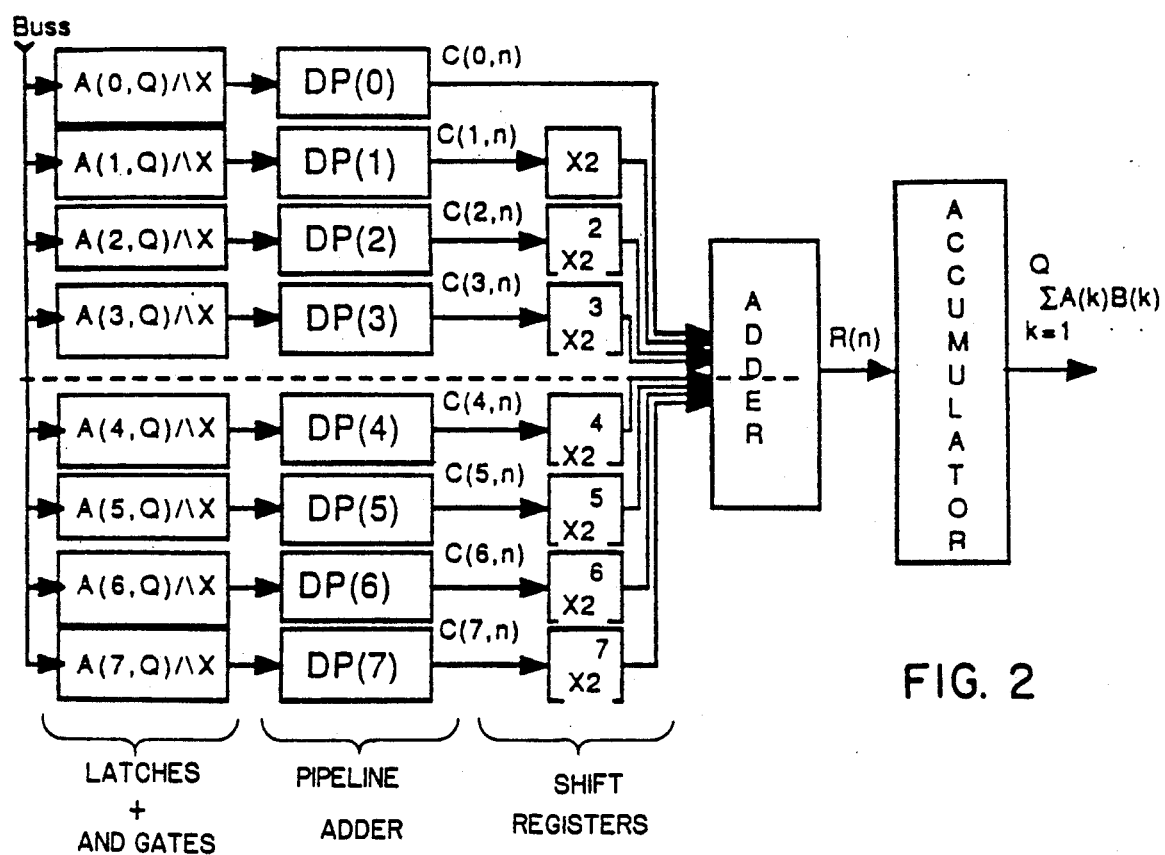
FIG. 2 is a block diagram of a preferred embodiment of a circuit which can execute my parallel processing algorithm.

A block diagram of an integrated circuit to implement my parallel processing algorithm for $Q=64$ and $N=7$ is illustrated in FIG. 2.

Eight latches of length 64 are used to hold the eight bit planes, $A(j,Q)$, associated with the $A(k)$'s. Each bit plane is placed on the bus and loaded in parallel on the appropriate register in descending order with $A(7,Q)$ on the bottom. To generate $R(n)$, $B(n,Q)$ is latched and $C(j,n)$ is found by "ANDING" $B(n,Q)$ with $A(j,Q)$ and adding the ones at the output of the AND gates with a pipeline adder $DP(k)$. Since the negative of a two's complement number is found by inverting each bit and adding one, $C(7,n)$ is made negative when it is added to $C(6,n)$. Multiplying by powers of 2 is accomplished by shifting before adding the $C(j,n)$'s together to get $R(n)$. This process is done for each $B(n,Q)$ for $n=0,1,2,\ldots,7$ to obtain $R(0), R(1), \ldots, R(7)$.

To obtain $$R(0)2^0 + R(1)2^1 + R(2)2^2 + R(3)2^3 + R(4)2^4 + R(5)2^5 +$$

$$R(6)2^6 - R(7)2^7 = \sum_{k=1}^{64} A(k)B(k),$$

the $R(n)$'s are shifted and added using an accumulator which is zeroed at the beginning of each new $R(7)$. $R(7)$ is made negative when it is added to the other $R(n)$'s in the final accumulation loop. The $A(j,Q)$'s must first be loaded into the chip in the proper order and the $B(n,Q)$'s brought in in descending order with $B(7,Q)$ first and $B(0,Q)$ last.

In some applications, it would be better to load the $A(i,Q)$'s serially such as when operating on sensor data in real time. Used in this way, the chip can act as an adaptive digital filter or correlator for real time processing. If more than eight bits are used, two such circuits can be cascaded vertically with their outputs weighted and added together. Similarly, larger Q's can be accommodated by cascading the circuits horizontally and adding the outputs. Used in the above manner, the circuit can be thought of as a 64-word slice operator for sums of products. A simple example for Q=4 and N=7 is illustrated in FIG. 3A–3C.

Having described a preferred embodiment of my system for high speed calculation of the dot product of large dimensional vectors using twos complement representation, it will be understood by those skilled in this art that my invention may be modified in both arrangement and detail. Accordingly, the protection for my invention afforded should only be limited in accordance with the scope of the following claims.

I claim:

1. A system for calculating the dot product of a pair of vectors A(k) and B(k) of a dimension Q written in two's complement representation where k is the kth component of each vector, comprising:

bus means having a width sufficient for communicating signals representing a plurality of bit planes $A(j,Q)$ and $B(n,Q)$ corresponding to the two's complement representations of A(k) and B(k), respectively, where $A(j,Q)$ is the bit plane associated with the $2^j$ level and $B(n,Q)$ is the bit plane associated with the $2^n$ level;

means for calculating $C(j,n)=A(j,Q)\cdot B(n,Q)$ for each of said bit planes where $C(j,n)$ is the dot product of the $2^j$ bit plane of the A(k)'s with the $2^n$ bit plane of the B(k)'s and is the coefficient associated with $2^{(n+j)}$ including latch means connected to the bus means for receiving and holding the bit planes, means for ANDING $B(n,Q)$ with $A(j,Q)$, and pipeline adder means for adding the ones outputed by the means for ANDING;

adder means for sequentially determining $R(n)=C(0,n)2^0+C(1,n)2^1+\ldots+C(N-1,n)2^{(N-1)}+C(N,n)2^N$ for $n=0,1,2\ldots N$ through multiplication by powers of two by shifting before adding the C(j,n)'s together to get R(n); and means for shifting and accumulating the R(n)'s to thereby determine the dot product according to:

$$\sum_{K=1}^{Q} A(k)B(k) = R(0)2^0 + R(1)2^1 + \ldots + R(N-1)2^{N-1} - R(N)2^N.$$

* * * * *